Feb. 1, 1927.

C. E. L. LIPMAN

BELT TIGHTENER

Filed July 16, 1923

1,616,191

Witness:

Inventor:
Carl E. L. Lipman
By Ira J. Wilson Attys

Patented Feb. 1, 1927.

1,616,191

UNITED STATES PATENT OFFICE.

CARL E. L. LIPMAN, OF BELOIT, WISCONSIN, ASSIGNOR TO LIPMAN REFRIGERATOR CAR AND MANUFACTURING COMPANY, OF BELOIT, WISCONSIN, A CORPORATION OF DELAWARE.

BELT TIGHTENER.

Application filed July 16, 1923. Serial No. 651,717.

This invention relates in general to belt tighteners, and pertains more specifically to an apparatus in which the tension on the power transmitting belt is maintained through one of the power transmitting pulleys.

While my invention is capable of many uses, I have shown herein for purposes of illustration, the invention as embodied in a refrigerating apparatus, which is driven by an electric motor, and in this exemplification of the invention, the tension upon the power transmitting belt is maintained by moving the motor to which the driving belt is directly connected, bodily in a direction to maintain the requisite tension on the belt.

One of the primary purposes of this invention is to provide an apparatus which will be simple in construction, reliable in operation, and efficient and durable in use, and one which will be capable of maintaining the driving belt under the requisite tension irrespective of variations in the length of the belt resulting from expansion or contraction thereof.

For the purpose of facilitating an understanding of my invention, I have illustrated in the accompanying drawings, one preferred embodiment thereof, from an inspection of which, when considered in connection with the following description, my invention and many of its attendant advantages should be readily understood and appreciated.

Referring to the drawings.

Figure 1:
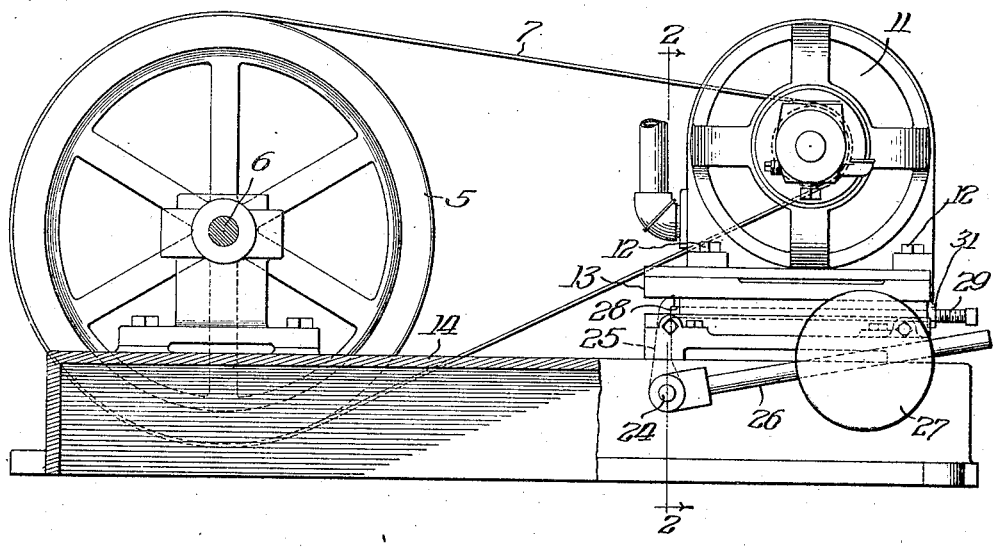
Fig. 1 is a side elevation of an apparatus embodying my invention.
Figure 2:
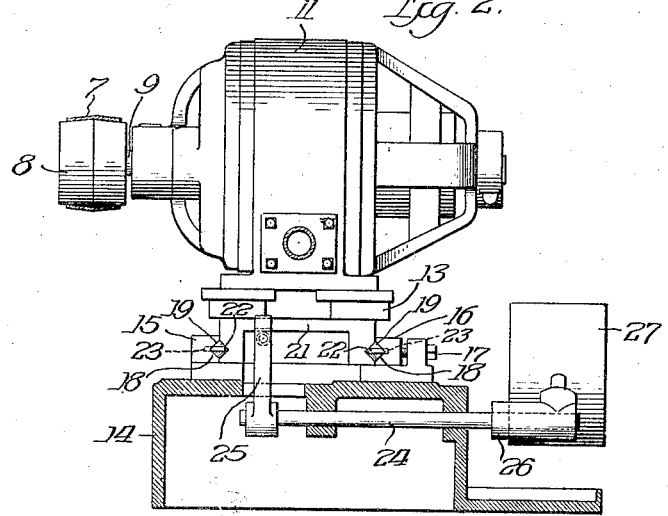
Fig. 2 is a vertical sectional view on the line 2—2 of Fig. 1.

Referring now to the drawings more in detail, reference character 5 indicates the driven pulley of any preferred machine, such for instance, as a refrigerating machine, the power shaft 6 of which has the various mechanisms to be operated connected thereto, this shaft being driven from the pulley 5.

A power transmitting belt 7 is trained over the driven pulley 5 and over a power pulley 8 directly connected to the shaft 9 of an electric motor 11 fixedly secured by bolts 12 or otherwise to a carriage, designated generally by reference character 13.

This carriage is mounted to slide horizontally upon a base 14 equipped with a pair of guide-ways, one of which, indicated by reference character 15, is fixed to the base, and the other of which, indicated by 16, is adjustable toward and from the guide-way 15 by means of adjusting screws 17. The guide-ways 15 and 17 are provided on their opposed faces with V-shaped grooves or ways 18, in which are disposed at an angle to the perpendicular, a plurality of anti-friction rollers 19 upon which the weight of the carriage and motor mounted thereon, are supported, the lower yoke-shaped portion 21 of the carriage being provided on its outer vertical faces with similarly shaped grooves or ways 22 adapted to receive the rollers 19. These rollers are maintained in position in the channels between the guide-ways and the lower portion of the carriage by pins 23 inserted into the members 15 and 16 and projecting into the path of the rollers at each end of the carriage, so that the rollers are thereby precluded against displacement from the ways.

It will be manifest from the foregoing that the carriage, with the motor and driving pulley mounted thereon, is capable of sliding movement upon the base 14. For the purpose of continuously urging this carriage in a direction away from the driven pulley 5, or in other words, toward the right, viewing Fig. 1, so as to maintain the power transmitting belt 7 under the requisite tension, I have provided mechanism, in the general form of a bell crank lever, adapted to be actuated by a weight. This lever comprises, as will be apparent from the drawings, a rock shaft 24 journaled in suitable bearings in the base and forming the fulcrum of the lever, an arm 25 fixed upon the inner end of the shaft and extending upwardly in proximity to the inner end of the carriage, and an arm 26 fixed to the outer end of the lever and projecting parallel with the side wall of the base. Upon this lever, there is mounted, preferably adjustably, a weight 27, which under the influence of gravity tends to swing the bell crank lever in a clockwise direction, viewing Fig. 1.

In order to adapt the device to belts varying considerably in length, I have provided between the arm 25 of the lever and the end of the carriage 13, an adjustable abutment member 28, which is slidably disposed in a guide-way extending longitudinally of the base, and is connected to the inner end of a threaded bolt 29, which is threaded into a tapped opening in the carriage. By adjusting the bolt inwardly or outwardly, the extent of projection of the abutment member 28 beyond the end of the carriage may be regulated and the bolt is adapted to be locked in adjusted position by a lock nut 31 threaded thereon. The weight 27 acting through the bell crank lever against the abutment member 28 carried by the carriage 13, tends to urge this carriage continuously toward the right, viewing Fig. 1, the movements of the carriage being facilitated by the roller bearings upon which the weight of the carriage is sustained. The driving pulley 8 is thereby caused to exert a constant tension upon the driving belt 7 so that power will be transmitted to the driven pulley 5 without undue slippage. Expansion or contraction of the belt is automatically taken care of by the tightener, and should it be necessary to remove or replace the belt, this operation can readily be performed by simply sliding the carriage toward the driven pulley sufficiently to relieve the tension on the belt.

My invention and many of its inherent advantages should be understood from the foregoing without further description, and it should be likewise understood that the invention is capable of embodiment in forms differing materially from that illustrated and described, without departing from the essence of the invention as defined in the following claims.

I claim:

1. In a belt tightener, the combination of a base, a carriage slidably mounted therein, a pulley on said carriage, a lever fulcrumed on said base, a weight mounted on said lever, and a single abutment carried by said carriage and adjustable in the direction of sliding of said carriage and in the path of movement of said lever whereby said carriage is actuated from the lever and the extent of sliding movement of said carriage in one direction may be predetermined.

2. In a belt tightener, the combination of a base provided with roller bearings, a carriage mounted on said bearings, a pulley carried by said carriage, a bell crank lever fulcrumed on said base, a weight mounted on said lever, and a bolt adjustably mounted on said carriage and provided with an abutment disposed in the path of movement of said lever whereby pressure exerted by said lever under the influence of said weight is transmitted to said carriage to exert a tension upon a belt engaged with said pulley.

3. In a belt tightener in combination, a base, a plurality of guides in said base, a carriage mounted to slide on said guides, means to adjust the frictional engagement of said carriage and guides, a pulley on said carriage, a lever fulcrumed on said base, a weight mounted on said lever, and a single abutment adjustably carried by said carriage in the path of movement of said lever whereby said carriage is actuated by said lever.

4. In combination, a relatively fixed base, a carriage slidably mounted on said base, an abutment on said carriage, a prime mover fixed to said carriage, means on said mover adapted to drivingly engage a driven means, and means adapted to move said carriage relatively to said driven means comprising a lever fulcrumed on said base and adapted to yieldingly engage said abutment on said carriage, and a weight mounted on said lever, said abutment on said carriage being adjustable in a plane parallel to the direction of movement of said carriage and projectable into the path of movement of said lever.

CARL E. L. LIPMAN.